United States Patent
Rogenmoser et al.

(10) Patent No.: US 6,988,115 B2
(45) Date of Patent: Jan. 17, 2006

(54) METHOD AND APPARATUS TO CORRECT LEADING ONE PREDICTION

(75) Inventors: Robert Rogenmoser, Santa Clara, CA (US); Lief O'Donnell, Sunnyvale, CA (US)

(73) Assignee: Broadcom Corporation, Irvine, CA (US)

(*) Notice: Subject to any disclaimer, the term of this patent is extended or adjusted under 35 U.S.C. 154(b) by 792 days.

(21) Appl. No.: 09/849,052

(22) Filed: May 4, 2001

(65) Prior Publication Data

US 2002/0165887 A1 Nov. 7, 2002

(51) Int. Cl.
G06F 5/01 (2006.01)

(52) U.S. Cl. ...................... 708/205; 708/505

(58) Field of Classification Search ............... 708/205, 708/211, 505, 670, 700
See application file for complete search history.

(56) References Cited

U.S. PATENT DOCUMENTS

| | | | |
|---|---|---|---|
| 4,922,446 A | | 5/1990 | Zurawski et al. |
| 5,369,607 A | | 11/1994 | Okamoto |
| 5,633,819 A | * | 5/1997 | Brashears et al. .......... 708/505 |
| 5,684,729 A | | 11/1997 | Yamada et al. |
| 5,867,407 A | | 2/1999 | Wolrich et al. |
| 5,920,493 A | | 7/1999 | Lau |
| 5,957,997 A | | 9/1999 | Olson et al. |

(Continued)

FOREIGN PATENT DOCUMENTS

| | | |
|---|---|---|
| EP | 0663635 A | 7/1995 |
| EP | 02253078.6 | 2/2005 |

OTHER PUBLICATIONS

E. Hokenek and R. K. Montoye, "Leading–zero anticipator in the IBM RS/6000 floating–point execution unit," IBM Journal of Research and Development, vol. 34, No. 1, pp. 71–77, Jan. 1990.

N. T. Quach and M. J. Flynn, "Leading one prediction—implementation, generalization, and application," Technical Report No. CSL–TR–91–463, Computer Systems Laboratory, Stanford University, Mar. 1991.

Bruguera, et al., "Leading–One Prediction with Concurrent Position Correction," IEEE, vol. 48, No. 10 Oct. 1999, 8 pages.

Suzuki, et al., "Leading–Zero Anticipatory Logic for High–Speed Floating Point Addition," IEEE, vol. 31, No. 8, Aug. 1996, 4 pages.

SiByte, "Target Applications," http://sibyte.com/mercurian/applications.htm, Jan. 15, 2001, 2 pages.

SiByte, "SiByte Technology," http://sibyte.com/mercurian/technology.htm, Jan. 15, 2001, 3 pages.

(Continued)

*Primary Examiner*—D. H. Malzahn
(74) *Attorney, Agent, or Firm*—Garlick Harrison & Markison LLP

(57) ABSTRACT

A leading one correction circuit receives a significand from a floating point adder and a corresponding leading one prediction from a leading one predictor, and determines if the leading one prediction is correct. In one embodiment, the leading one prediction is a one hot vector having the same number of bits as the significand, with the set bit in the position predicted to have the leading one. In such an embodiment, the leading one correction circuit may perform a bitwise AND of the significand and leading one prediction, and the result of the bitwise AND may be ORed to generate a signal indicating whether or not the prediction is correct. In one implementation, the leading one correction circuit may operate concurrent with a shift of the significand in response to a shift amount indicated by the leading one prediction.

22 Claims, 7 Drawing Sheets

U.S. PATENT DOCUMENTS

| | | | |
|---|---|---|---|
| 5,974,432 A | | 10/1999 | Orup |
| 6,085,208 A | | 7/2000 | Oberman et al. |
| 6,085,211 A | * | 7/2000 | Yoshioka .................... 708/505 |
| 6,405,232 B1 | * | 6/2002 | Green et al. ................ 708/505 |
| 6,499,044 B1 | * | 12/2002 | Brooks et al. .............. 708/211 |
| 6,571,267 B1 | * | 5/2003 | Yoshioka .................... 708/505 |
| 6,594,679 B1 | * | 7/2003 | Lee et al. ................... 708/211 |

OTHER PUBLICATIONS

SiByte, "The Mercurian Processor," http://sibyte.com/mercurian, Jan. 15, 2001, 2 pages.

SiByte, "Fact Sheet," SB–1 CPU, Oct. 2000, rev. 0.1, 1 page.

SiByte, "Fact Sheet," SB–1250, Oct. 2000, rev. 0.2, 10 pages.

Stepanian, SiByte, SiByte SB–1 MIPS64 CPU Core, Embedded Processor Forum 2000, Jun. 13, 2000, 15 pages.

Jim Keller, "The Mercurian Processor: A High Performance, Power–Efficient CMP for Networking," Oct. 10, 2000, 22 pages.

Tom R. Halfhill, "SiByte Reveals 64–Bit Core For NPUs; Independent MIPS64 Design Combines Low Power, High Performance," Microdesign Resources, Jun. 2000, Microprocessor Report, 4 pages.

* cited by examiner

Prediction[63:0]   0010 0000 0000 0000 0000 0000 0000 0000 0000 0000 0000 0000 0000 0000 0000 0000

Result[63:0]       0001 0010 0000 0111 0000 0101 0011 0000 0110 0000 0000 0110 1010 1111 0000 1111

Result & Prediction   0000 0000 0000 0000 0000 0000 0000 0000 0000 0000 0000 0000 0000 0000 0000 0000

OR Result          0 (Correction Needed)

*Fig. 6*

Prediction[63:0]   0010 0000 0000 0000 0000 0000 0000 0000 0000 0000 0000 0000 0000 0000 0000 0000

Result[63:0]       0010 0010 0000 0111 0000 0101 0011 0000 0000 0110 1010 1111 0000 1111

Result & Prediction   0010 0000 0000 0000 0000 0000 0000 0000 0000 0000 0000 0000 0000 0000 0000 0000

OR Result          1 (No Correction Needed)

*Fig. 7*

METHOD AND APPARATUS TO CORRECT LEADING ONE PREDICTION

BACKGROUND OF THE INVENTION

1. Field of the Invention

This invention is related to the field of processor arithmetic units and, more particularly, to leading one prediction in floating point arithmetic units.

2. Description of the Related Art

Floating point arithmetic is a common feature of modern instruction set architectures. Generally, floating point numbers are represented with a value including a sign bit (s), a biased exponent (exp), and a significand (sd). The floating point number being represented is equal to $(-1)^{s}*2^{exp-bias}*1.sd$ (assuming the number is normalized). The value of the bias may depend on the precision of the floating point number, as may the number of bits in the exponent and the significand. For example, the Institute of Electrical and Electronic Engineers (IEEE) has promulgated standards (e.g. IEEE 754) for floating point numbers including single precision (32 bit) and double precision (64 bit) numbers. The single precision number includes 1 sign bit, 8 bits of exponent, and 23 bits of significand. The double precision number includes 1 sign bit, 11 bits of exponent, and 52 bits of significand. In both cases, the digit to the left of the binary point is implied and thus not represented in the 23 or 52 bit significand. If the number is normalized (or simply "normal"), the implied bit is a binary one. If the number is denormalized (or simply "denorm"), the implied bit is a binary zero (and the exponent has a predetermined value indicating that the number is a denorm). Denormal numbers are frequently used to represent numbers which cannot be represented with both an implied bit of one and an exponent within the range provided for the given precision.

When adding or subtracting floating point numbers, the numbers are generally adjusted until the exponents are equal. Specifically, the significand of the number with the smaller exponent may be right shifted until the exponents of the numbers are equal (thus, the implied bit of the adjusted number is zero and the adjusted number is a denorm) and the number with the larger exponent is held constant. The significands of the adjusted numbers can be added/subtracted, and the resulting significand with the larger exponent represents the resulting floating point number.

If the magnitudes of the numbers are similar, the subtraction of the significands (or the addition, if the sign bits are opposite) may yield a resulting significand having one or more zeros in the most significant bits before the first one is detected (leading zeros). For example (using eight bit significands for convenience, with the significands illustrated in binary with the most significant bit first), 1011 1000–1011 0000=0000 1000. In this example, there are four leading zeros before the first one (the leading one) in the resulting significand. Such a result requires modification to represent the result in normal form. Particularly, the resulting significand should be left shifted until the most significant bit is a one and the exponent of the result should be adjusted accordingly.

Unfortunately, the normalization of the result is time consuming. Generally, the leading zeros are counted to produce a shift amount, and the resulting significand is left shifted by the shift amount (and the exponent of the result is the larger exponent of the numbers being added decreased by the shift amount). The serial process of generating the resulting significand, counting the leading zeros, and left shifting is time consuming, and thus increases the latency for completing the addition/subtraction.

Some floating point execution units including a leading one predictor which operates concurrent with the adder. The leading one predictor predicts the position within the result of the leading one, and the prediction is either correct or errors by one bit to the more significant side of the actual leading one. The resulting significand is shifted by a shift amount corresponding to the leading one prediction. The most significant bit of the shifted result is then analyzed to determine if the leading one prediction is correct. If the most significant bit of the shifted result is a one, the leading one prediction is correct. If the most significant bit is a zero, the second most significant bit will be a one and the shifted result is shifted by one more bit to complete the normalization. Unfortunately, analyzing the most significant bit resulting from the shift still adds latency to the addition.

Some other methods attempt to alleviate the delay of analyzing the most significant bit by, concurrent with the addition and leading one prediction, generating a correction of the prediction for cases in which the prediction is incorrect. For example, such a method is proposed in "Leading One Prediction with Concurrent Position Correction" by J. D. Bruguera and T. Lang in IEEE Transactions on Computers, Vol. 48, No. 10, October 1999 (incorporated herein by reference in its entirety). Unfortunately, such methods may increase the area occupied by the prediction logic by approximately 50%.

SUMMARY OF THE INVENTION

A leading one correction circuit receives a significand from a floating point adder and a corresponding leading one prediction from a leading one predictor, and determines if the leading one prediction is correct. The determination may be used to control a zero or one bit correction shift of a shifted significand (shifted by an amount indicated by the leading one prediction). In one embodiment, the leading one prediction is a one hot vector having the same number of bits as the significand, with the set bit in the position predicted to have the leading one. In such an embodiment, the leading one correction circuit may perform a bitwise AND of the significand and leading one prediction, and the result of the bitwise AND may be ORed to generate a signal indicating whether or not the prediction is correct. In one implementation, the leading one correction circuit may operate concurrent with a shift of the significand in response to a shift amount indicated by the leading one prediction (to produce the shifted significand), and thus may not add to the latency of the floating point addition. In one implementation, the leading one correction circuit may occupy less area than the Bruguera and Lang proposal. While a floating point significand and corresponding leading one prediction are used as an example, the leading one correction circuit may be used with any value and a corresponding leading one prediction for that value.

Broadly speaking, an apparatus for use with an adder configured to generate a value and a leading one predictor configured to generate a leading one prediction corresponding to the value is contemplated. The apparatus comprises a circuit coupled to receive the value and the leading one prediction; and the circuit is configured to generate an indication of whether or not the leading one prediction is correct responsive to the value and the leading one prediction.

Additionally, a floating point execution unit is contemplated. The floating point execution unit comprises an adder, a leading one predictor, and a circuit. The adder is coupled to receive at least two significands and is configured to generate an output significand in response thereto. The leading one predictor is coupled to receive the at least two significands and configured to generate a leading one prediction corresponding to the output significand in response to the at least two significands. Coupled to receive the output significand and the leading one prediction, the circuit is configured to generate an indication of whether or not the leading one prediction is correct responsive to the output significand and the leading one prediction.

Moreover, a method is contemplated. A value is received from an adder and a corresponding leading one prediction is received. Whether or not the leading one prediction is correct is determined responsive to the value and the leading one prediction.

BRIEF DESCRIPTION OF THE DRAWINGS

The following detailed description makes reference to the accompanying drawings, which are now briefly described.

FIG. 6 is a first example of the operation of one embodiment of the leading one correction circuit shown in FIG. 2.

FIG. 7 is a second example of the operation of one embodiment of the leading one correction circuit shown in FIG. 2.

Figure 1:
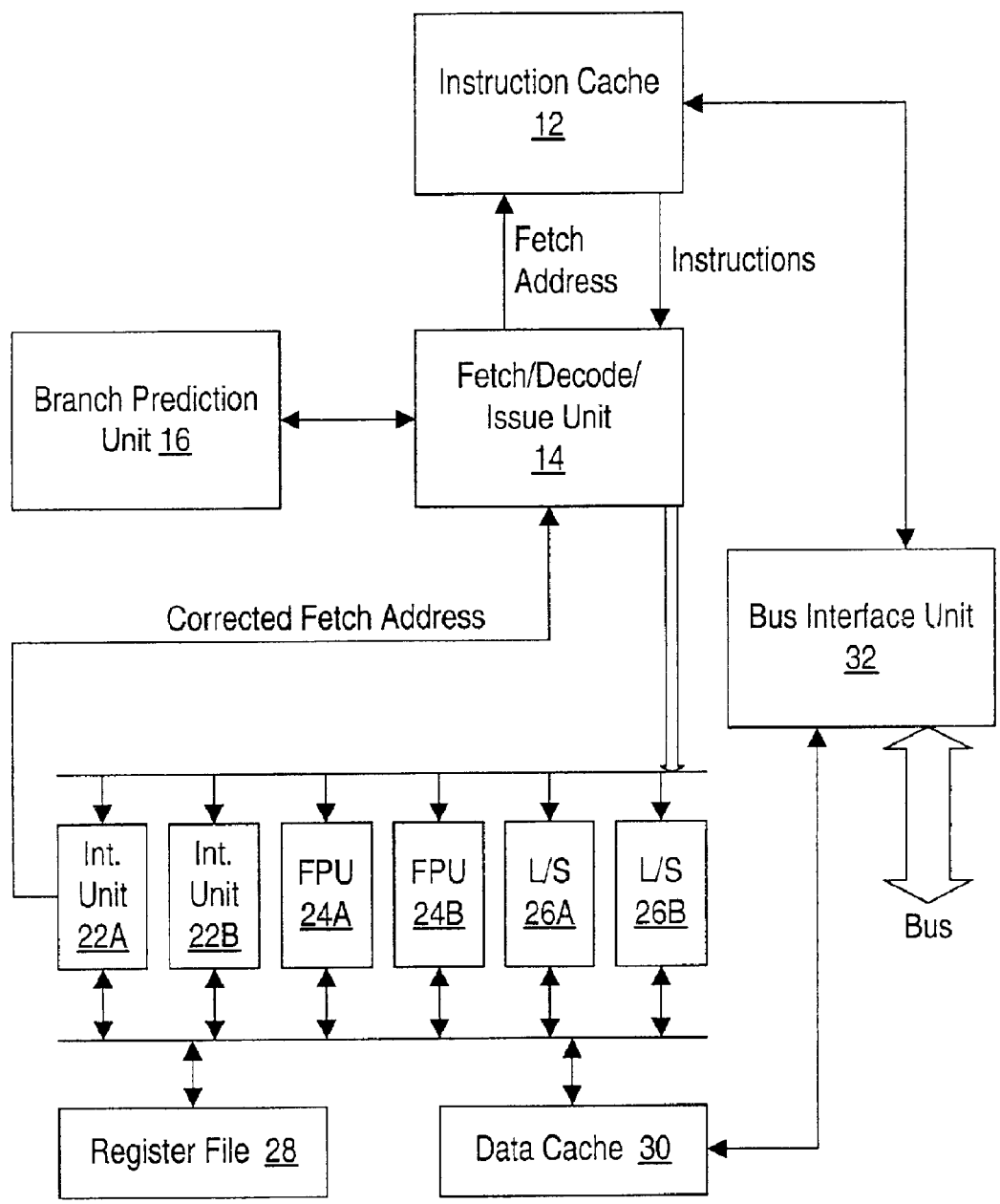
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Processor Overview

Turning now to FIG. 1, a block diagram of one embodiment of a processor 10 is shown. Other embodiments are possible and contemplated. In the embodiment of FIG. 1, the processor 10 includes an instruction cache 12, a fetch/decode/issue unit 14, a branch prediction unit 16, a set of integer execution units 22A–22B, a set of floating point execution units 24A–24B, a set of load/store execution units 26A–26B, a register file 28, a data cache 30, and a bus interface unit 32. The instruction cache 12 is coupled to the bus interface unit 32, and is coupled to receive a fetch address from, and provide corresponding instructions to, the fetch/decode/issue unit 14. The fetch/decode/issue unit 14 is further coupled to the branch prediction unit 16 and the execution units 22A–22B, 24A–24B, and 26A–26B. Specifically, the fetch/decode/issue unit 14 is coupled to provide a branch address to the branch prediction unit 16 and to receive a prediction and/or a target address from the branch prediction unit 16. The fetch/decode/issue unit 14 is coupled to provide instructions for execution to the execution units 22A–22B, 24A–24B, and 26A–26B and to receive a corrected fetch address from the integer execution unit 22A. The execution units 22A–22B, 24A–24B, and 26A–26B are generally coupled to the register file 28 and the data cache 30, and the data cache 30 is coupled to the bus interface unit 32.

Generally speaking, the fetch/decode/issue unit 14 is configured to generate fetch addresses for the instruction cache 12 and to receive corresponding instructions therefrom. The fetch/decode/issue unit 14 uses branch prediction information to generate the fetch addresses, to allow for speculative fetching of instructions prior to execution of the corresponding branch instructions. Specifically, in one embodiment, the branch prediction unit 16 include an array of branch predictors indexed by the branch address (e.g. the typical two bit counters which are incremented when the corresponding branch is taken, saturating at 11 in binary, and decremented when the corresponding branch is not taken, saturating at 00 in binary, with the most significant bit indicating taken or not taken). While any size and configuration may be used, one implementation of the branch predictors 16 may be 4 k entries in a direct-mapped configuration. Additionally, in one embodiment, the branch prediction unit 16 may include a branch target buffer comprising an array of branch target addresses. The target addresses may be previously generated target addresses of any type of branch, or just those of indirect branches. Again, while any configuration may be used, one implementation may provide 64 entries in the branch target buffer. Still further, an embodiment may include a return stack used to store link addresses of branch instructions which update a link resource ("branch and link" instructions). The fetch/decode/issue unit 14 may provide link addresses when branch instructions which update the link register are fetched for pushing on the return stack, and the return stack may provide the address from the top entry of the return stack as a predicted return address. While any configuration may be used, one implementation may provide 8 entries in the return stack.

The fetch/decode/issue unit 14 decodes the fetched instructions and queues them in one or more instruction queues for issue to the appropriate execution units. The instructions may be speculatively issued to the appropriate execution units, again prior to execution/resolution of the branch instructions which cause the instructions to be speculative. In some embodiments, out of order execution may be employed (e.g. instructions may be issued in a different order than the program order). In other embodiments, in order execution may be used. However, some speculative issue/execution may still occur between the time that a branch instruction is issued and its result is generated from the execution unit which executes that branch instruction (e.g. the execution unit may have more than one pipeline stage).

The integer execution units 22A–22B are generally capable of handling integer arithmetic/logic operations, shifts, rotates, etc. At least the integer execution unit 22A is configured to execute branch instructions, and in some embodiments both of the integer execution units 22A–22B may handle branch instructions. In one implementation, only the execution unit 22B executes integer multiply and divide instructions although both may handle such instructions in other embodiments. The floating point execution units 24A–24B similarly execute the floating point instructions. The integer and floating point execution units 22A–22B and 24A–24B may read and write operands to and from the register file 28 in the illustrated embodiment, which may include both integer and floating point registers. The load/store units 26A–26B may generate load/store addresses in response to load/store instructions and perform cache accesses to read and write memory locations through the data cache 30 (and through the bus interface unit 32, as needed), transferring data to and from the registers in the register file 28 as well.

The instruction cache 12 may have any suitable configuration and size, including direct mapped, fully associative, and set associative configurations. Similarly, the data cache 30 may have any suitable configuration and size, including any of the above mentioned configurations. In one implementation, each of the instruction cache 12 and the data cache 30 may be 4 way set associative, 32 kilobyte (kb) caches including 32 byte cache lines. Both the instruction cache 12 and the data cache 30 are coupled to the bus interface unit 32 for transferring instructions and data into and out of the caches in response to misses, flushes, coherency activity on the bus, etc.

In one implementation, the processor 10 is designed to the MIPS instruction set architecture (including the MIPS-3D and MIPS MDMX application specific extensions). The MIPS instruction set may be used below as a specific example of certain instructions. However, other embodiments may implement the IA-32 or IA-64 instruction set architectures developed by Intel Corp., the PowerPC instruction set architecture, the Alpha instruction set architecture, the ARM instruction set architecture, or any other instruction set architecture.

It is noted that, while FIG. 1 illustrates two integer execution units, two floating point execution units, and two load/store units, other embodiments may employ any number of each type of unit, and the number of one type may differ from the number of another type.

Floating Point Execution Unit

Figure 2:
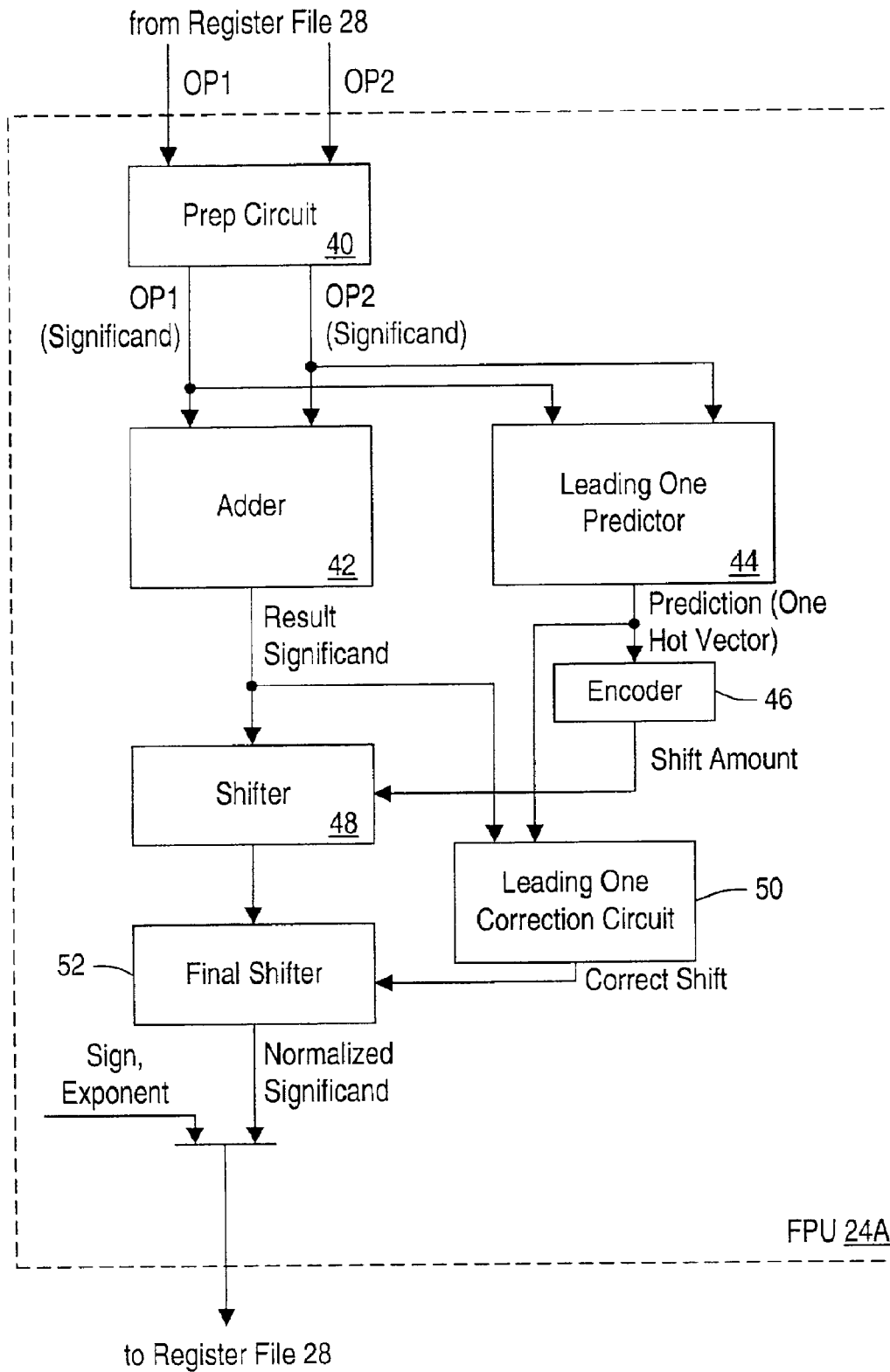
FIG. 2 is a block diagram of one embodiment of a floating point execution unit.

Turning now to FIG. 2, a block diagram of one embodiment of the floating point execution unit (FPU) 24A is shown. Other embodiments are possible and contemplated. In the embodiment of FIG. 2, the FPU 24A includes a prep circuit 40, an adder 42, a leading one predictor 44, an encoder 46, a shifter 48, a leading one correction circuit 50, and a final shifter 52. The prep circuit 40 is coupled to receive operands (OP1 and OP2) from the register file 28 and is coupled to the adder 42 and the leading one predictor 44. The adder 42 is coupled to the shifter 48 and the leading one correction circuit 50. The leading one prediction circuit 44 is coupled to the encoder 46 and the leading one correction circuit 50. The encoder 46 is coupled to the shifter 48, which is further coupled to the final shifter 52. The final shifter 52 is coupled to the leading one correction circuit 50 and to provide a normalized significand.

The FPU 24A receives floating point operands OP1 and OP2. The prep circuit 40 prepares the operands for addition. Specifically, the prep circuit 40 may right shift the operand having the smaller exponent by the number of bits equal to the difference between the smaller and larger exponents of OP1 and OP2. The significands thus modified are output by the prep circuit 40 to the adder 42 and the leading one predictor 44. The prep circuit 40 may also provide the signs of the operands or an add/subtract signal based on the signs of the operands and the instruction to be executed (e.g. a floating point add or subtract instruction). Alternatively, the prep circuit 40 may one complement or twos complement one of the operands to cause a subtraction to be performed by the adder 42. The adder 42 adds (or subtracts) the significands, producing a result significand to both the shifter 48 and the leading one correction circuit 50. The leading one predictor 44 generates a prediction of the position of the leading one, outputting the prediction to the encoder 46 and the leading one correction circuit 50. The leading one predictor 44 may be well known in the art. Any suitable leading one predictor may be used. For example, the leading one predictor proposed in Bruguera and Lang may compute the difference of each bit position of the operands (without carry or borrow from adjacent bits), and may generate each bit of the prediction from two or three adjacent bits of the difference vector. Other proposals may include Suzuki, et al. "Leading-Zero Anticipatory Logic for High Speed Floating Point Addition", IEEE Journal of Solid State Circuits, Vol. 31, No. 8 August 1996 (incorporated herein by reference in its entirety) and Quach and Flynn, "Leading One Prediction-Implementation, Generalization, and Application", Technical Report CSL-TR-91-463, Stanford University, March 1991 (incorporated herein by reference in its entirety).

Generally, the prediction generated by the leading one predictor 44 is either correct (i.e. the prediction identifies the position of the leading one within the result significand) or is incorrect and predicts the next most significant bit to the leading one within the result significand. Accordingly, if the result significand is left shifted so the bit predicted by the prediction is the most significant bit, then either the most significant bit of the shifted result significand is a one or, if the most significant bit is a zero, the second most significant bit of the shifted result significand is a one. Therefore, a final left shift of either zero bits or one bit is provided dependent on whether or not the prediction is correct.

The leading one correction circuit 50 determines whether or not the prediction is correct, using the prediction and the result significand. The leading one correction circuit 50 may generally determine if the bit indicated by the prediction within the significand is a binary one. If the predicted bit is a binary one, the leading one correction circuit 50 determines that the prediction is correct. Thus, the output of the shifter 48 is the normalized significand resulting from the addition/subtraction being performed by the FPU 24A and no additional correction is performed. If the predicted bit is not a binary one, the prediction is incorrect. Thus, the output of the shifter 48 is corrected with a one-bit left shift in the final shifter 52 to generate the normalized significand. The leading one correction circuit 50 outputs a correct shift signal indicating whether or not the prediction is correct, and the correct shift signal is received by the final shifter 52 to either perform the one bit shift of the output of the shifter 48 or to pass the output of the shifter 48 through unmodified.

In the illustrated embodiment, the prediction is a one hot vector where each bit in the vector corresponds to one of the significand bits. The set bit in the one hot vector indicates the predicted position of the leading one in the result significand. For such an embodiment, the leading one correction circuit 50 may perform a bitwise AND of the prediction bits and the corresponding result significand bits. The results of the ANDs may be ORed to produce the correct shift signal as an output. In this embodiment, the correct shift signal may be a binary one if the prediction is correct (and this the shifter 48 provides the correct shift of the result significand) and a binary zero if the prediction is incorrect.

In one embodiment, the leading one correction circuit 50 operates concurrent with the shifter 48. Thus, the operation of the leading one correction circuit 50 may not add to the latency of completing the addition/subtraction as methods which analyze the most significant bit of the shifted result significand would. Additionally, the leading one correction circuit 50 may, in some embodiments, be implemented in less circuit area than the proposal by Bruguera and Lang mentioned above. In one example implementation, the leading one correction circuit 50 may be approximately 25% of the area of the concurrent correction proposal by Bruguera and Lang.

The encoder 46 encodes the prediction into a shift amount for the shifter 48, which left shifts the result significand by the shift amount. The encoder generates a shift amount indicated by the prediction (i.e. the shift amount would cause the leading one to be shifted to the most significant bit if the prediction is correct). Other circuitry (not shown) may generate the sign and exponent for the result. Specifically, the resulting exponent may be the larger exponent of the operands OP1 and OP2, reduced by the shift amount provided by encoder 46 and reduced by one more if the prediction from the leading one predictor 44 is incorrect. It is noted that the most significant bit of the significand may be dropped from the result if the result is a normal number. It is also noted that additional circuitry (not shown) may be included to detect if the result is a denorm or other special number (e.g. signalling or quiet not-a-numbers in the IEEE 754 standard). The additional circuitry may modify the output of FPU 24A if the result is a denorm or special number. The additional circuitry may be integrated into the circuitry shown, if desired.

It is noted that, while the embodiment of the leading one correction circuit 50 described above outputs a signal indicating whether or not the prediction is correct, other embodiments may output any suitable indication. Furthermore, embodiments in which the output signal is a binary zero if the prediction is correct and a binary one if the prediction is incorrect are contemplated.

It is noted that, while the illustrated embodiment uses a one hot vector for providing the leading one prediction, any value which indicates the position of the leading one may be used. For example, the shift amount output by the encoder 46 may be used, if desired. Furthermore, a value which is the inverse of a one hot vector could be used. As used herein, the term "one hot vector" refers to a vector of binary bits, where at most one bit in the vector is set and the remaining bits are clear. The one hot prediction vector may have a set bit in the bit corresponding to the predicted position in the significand of the leading one. The term "leading one" of a value refers to the most significant bit of the value which is a binary one. Each more significant bit in the value than the leading one bit is a binary zero. The term "leading one prediction" refers to a prediction of which bit in the value is the leading one of that value.

It is noted that, while the leading one correction circuit 50 is used with regard to the addition/subtraction of floating point significands, other embodiments may employ the leading one correction circuit 50 for determining if the leading one prediction corresponding to any value is correct with respect to that value.

It is noted that, while FIG. 2 illustrates hardware for performing a floating point addition/subtraction, additional hardware may be included for performing floating point multiplication/division. Furthermore, additional hardware may be included for performing floating point transcendental operations such as sine, cosine, square root, etc., as desired. FPU 24B may be configured similar to FPU 24A.

Figure 3:
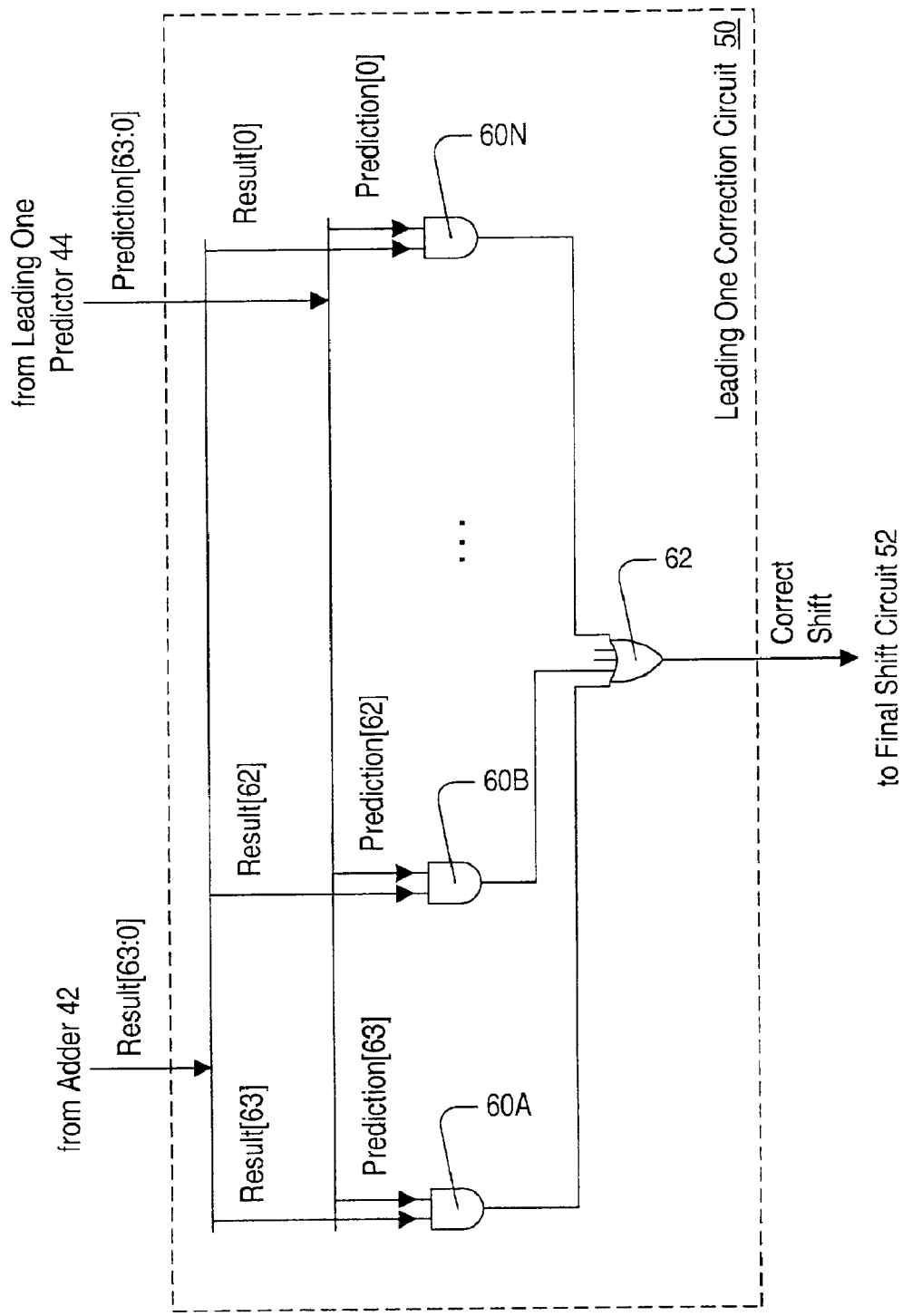
FIG. 3 is a circuit diagram of one embodiment of a leading one correction circuit shown in FIG. 2.

Turning now to FIG. 3, a circuit diagram of one embodiment of the leading one correction circuit 50 is shown. Other embodiments are possible and contemplated. In the embodiment of FIG. 3, the leading one correction circuit 50 includes a plurality of AND gates 60A–60N and an OR gate 62. Each of the AND gates 60A–60N is coupled to receive a different bit of the result significand (illustrated as Result[63:0] in FIG. 3) and a corresponding bit of the leading one prediction (illustrated as Prediction[63:0] in FIG. 3). The outputs of each of the AND gates 60A–60N are coupled as inputs to the OR gate 62, which provides the correct shift signal as its output.

Each of the AND gates logically ANDs one of the result significand bits and the corresponding leading one prediction bit. Since the leading one prediction is a one hot vector in this embodiment, with the set bit being in the position of the prediction which corresponds to the position in the significand at which the leading one is predicted, the AND of the result significand bits and the corresponding leading one prediction bits results in a logical one from one of the AND gates if the prediction is correct and a logical zero from the other AND gates. If the prediction is incorrect, the AND will result in a logical zero from each AND gate. Thus, a logical OR of the outputs of the AND gates 60A–60N (OR gate 62) results in a correct shift signal of one if the prediction is correct and zero if the prediction is incorrect.

In the illustrated embodiment, the one hot vector has a bit for each bit in the result significand. Therefore, each bit of the one hot vector corresponds to a different bit in the result significand. Each AND gate 60A–60N receives one bit of the significand result and the corresponding leading one prediction bit. For example, FIG. 3 shows AND gate 60A receiving the significand result bit 63 and the corresponding prediction bit 63. Similarly, AND gate 60B receives the significand result bit 62 and the prediction bit 62; and AND gate 60N receives the significand result bit 0 and the prediction bit 0. Other AND gates, not shown, receive bits 61:1 of the significand result and prediction, respectively. ANDing the corresponding bits of two values in this fashion is referred to as bitwise ANDing (and similarly performing other logical operations on the corresponding bits is referred to as a bitwise operation).

In the illustrated embodiment, the result significand is 64 bits. However, in other embodiments, any size significand may be supported. For example, significands of the size specified in the IEEE 754 standard may be supported (e.g. single precision, double precision, extended precision, etc.).

In the illustrated embodiment, the OR gate 62 has 64 inputs (one for each AND gate 60A–60N, where there are 64 bits in the illustrated embodiment). A wide OR such as OR gate 62 may be implemented in a number of fashions. For example, multiple levels of static or dynamic OR gates may be used to implement OR gate 62 (e.g. if four input OR gates are used, a first level having 16 OR gates, each receiving inputs from a different four of the AND gates 60A–60N, may feed a second level of 4 four input OR gates which may feed a third level of 1 four input OR gate). A wide dynamic OR gate may be used. Any suitable circuitry for performing the OR function may be used. Similarly, any circuitry performing an AND function may be used for each AND gate 60A–60N.

It is noted that the circuitry shown in FIG. 3 is merely exemplary. Specifically, any Boolean equivalents of the circuitry shown may be used. For example, NAND gates may be used instead of AND gates 60A–60N, and an AND gate may be used instead of OR gate 62. Alternatively, the logical sense of the output signal (correct shift) could be reversed (e.g. a logical zero indicating correct prediction and a logical one indicating incorrect prediction), in which case a NOR gate may be used in place of OR gate 62 or a NAND gate may be used in the above example in which NAND gates are used in place of AND gates 60A–60N. Furthermore, the input signals may be changed (e.g. the logical opposite of a one hot vector may be used in which the predicted position is a zero and all other bits are a logical one) and/or the significand result could have a binary zero for each bit which is actually a binary one and vice versa. Different gates may be used in these cases. Generally, embodiments in which a one hot vector (or the equivalent thereof) is used may include a set of logic circuits which perform a bitwise logic function on the corresponding significand and prediction bits and a second logic circuit which operates on the outputs of the set of logic circuits. As used herein, a logic circuit is a circuit (e.g. one or more transistors) which receives one or more inputs and performs a predefined logical function on the inputs to generate one or more outputs.

Figure 4:
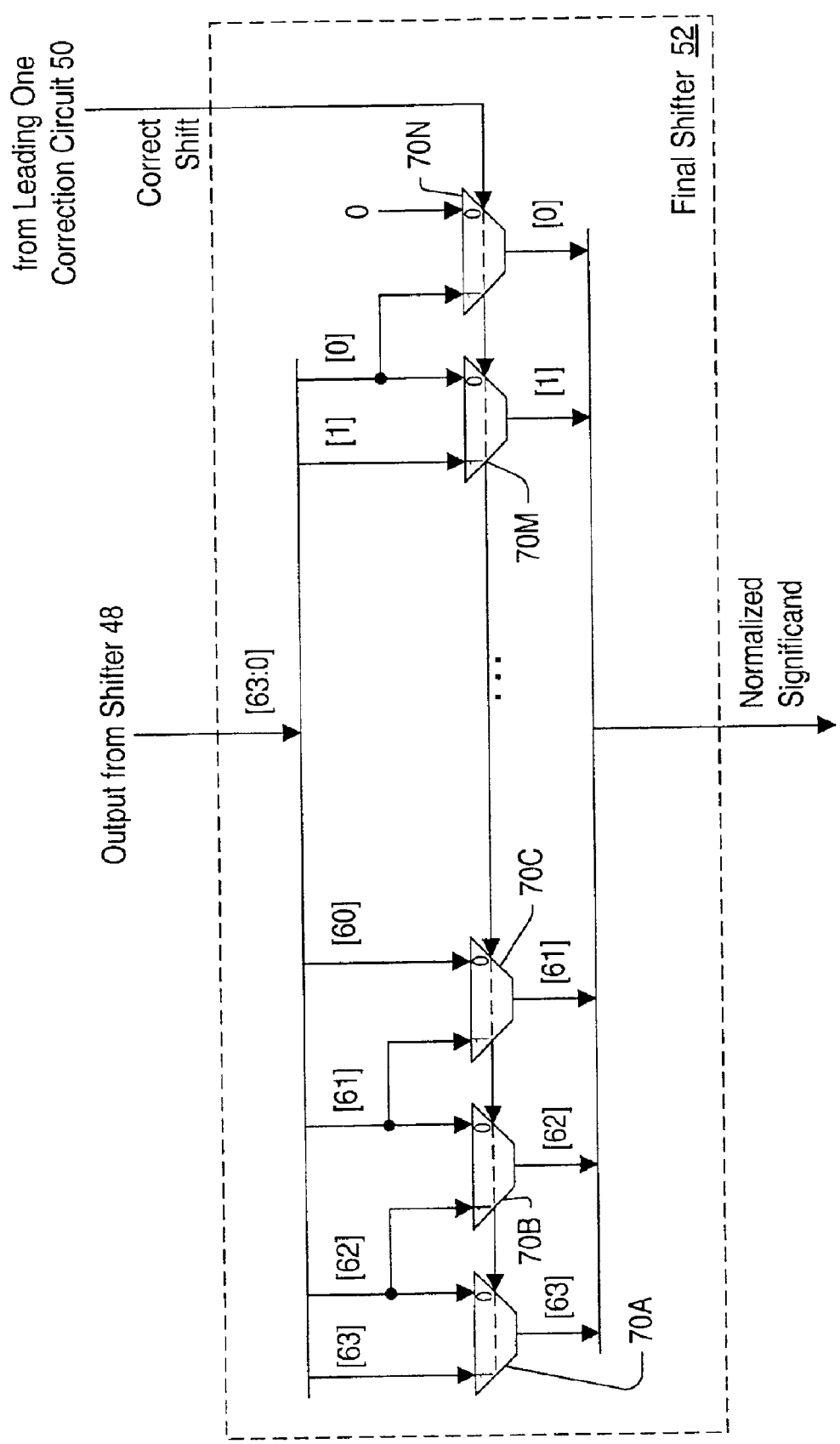
FIG. 4 is a circuit diagram of one embodiment of a final shifter shown in FIG. 2.

Turning now to FIG. 4, a block diagram of one embodiment of the final shifter 52 is shown. Other embodiments are possible and contemplated. In the embodiment of FIG. 4, the final shifter includes a set of multiplexors (muxes) 70A–70N. Each of the muxes 70A–70M is coupled to receive a first bit of the output from the shifter 48 and a second bit which is one bit less significant in the output to the first bit. Each of the muxes 70A–70M outputs a bit of the normalized significand, the bit being the same position as the first bit. For example, mux 70A is coupled to receive bit 63 (the most significant bit) and bit 62 (the bit which is one bit less significant than bit 63) and outputs bit 63 of the normalized significand. Similarly, mux 70B is coupled to receive bits 62 and 61 and outputs bit 62 of the normalized significand; mux 70C is coupled to receive bits 61 and 60 and outputs bit 61 of the normalized significand; and mux 70M is coupled to receive bits 1 and 0 and outputs bit 1 of the normalized significand. Mux 70N receives bit 0 and a binary 0 (since there is no less significant bit to bit 0) and outputs bit 0 of the normalized significand. Other muxes (not shown in FIG. 4) receive the remaining bits and output the remaining bits of the normalized significand in a similar fashion. There may be a total number of the muxes 70A–70N equal to the number of bits in the significand. Each of the muxes 70A–70N is coupled to receive the correct shift signal as a selection control.

The set of muxes 70A–70N is arranged to perform either a one bit left shift of the output from the shifter 48 or a zero bit shift. If the prediction is correct, in the illustrated embodiment, the correct shift signal is a binary one and the input of each mux labeled 1 is selected (e.g. the first bit, as described above). If the prediction is incorrect, the correct shift signal is a binary zero and the input of each mux labeled zero selected (e.g. the second bit, as described above), and thus a one bit left shift is performed. Other embodiments in which the meaning of a binary one and a binary zero of the correct shift signal are reversed may reverse the inputs connected to the zero input and the one input of the muxes 70A–70B.

It is noted that other embodiments of the final shifter 52 are contemplated. Any circuit which is capable of performing a zero or one bit left shift may be used. For example, a general shift circuit (capable of an N bit shift) may be used.

Figure 5:
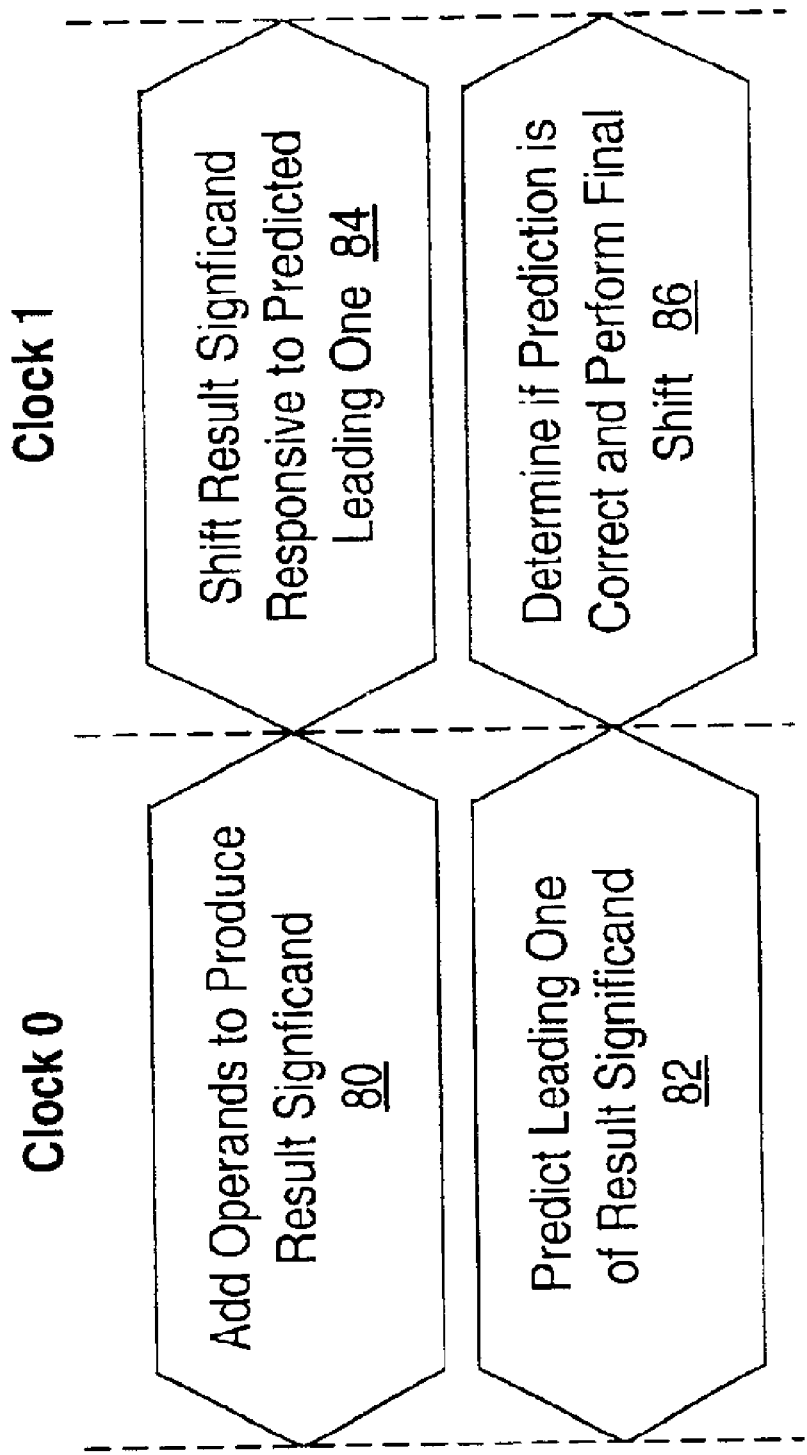
FIG. 5 is a timing diagram of illustrating operation of one embodiment of the floating point execution unit shown in FIG. 2.

Turning next to FIG. 5, a timing diagram illustrating one embodiment of a pipelining that may be employed within the FPU 24A is shown. Other embodiments are possible and contemplated. In FIG. 5, two clock cycles are shown delimited by vertical dashed lines (and labeled clock 0 and clock 1).

During clock 0, the operands are added in the adder 42 to produce the result significand (reference numeral 80). Additionally, the leading one predictor 44 predicts the leading one of the result significand using the operands (reference numeral 82).

During clock 1, the result significand is shifted in the shifter 48 responsive to the leading one prediction (reference numeral 84). Additionally, the leading one correction circuit 50 determines if the prediction is correct and the final shifter performs the final shift in response to the output from the leading one correction circuit 50 (reference numeral 86).

As mentioned above, the illustrated pipelining is merely exemplary and may vary from embodiment to embodiment. For example, the final shift may be performed in another clock cycle subsequent to clock 1. Additionally, in other embodiments, the clock cycles shown in FIG. 5 may actually be phases of a clock rather than clock cycles. Furthermore, rather than falling within a single clock period, the operations shown in FIG. 5 may occur in the second phase of a clock and the first phase of a following clock. Generally, the leading one correction circuit 50 may operate concurrent with the shifter 48. Similarly, the leading one prediction may be generated concurrent with the addition of the operands.

Turning next to FIG. 6, a first example of the operation of the leading one correction circuit 50 is shown. The example of FIG. 6 illustrates a misprediction by the leading one predictor 44. In the example, the leading one prediction predicts that the leading one will be in bit 61 (as indicated by the set bit at bit 61 of the leading one prediction). However, the leading one of the result significand is in bit 60. Thus, the leading one will be in bit position 62 after the left shift performed by the shifter 48 in response to the leading one prediction. The bitwise AND of the result and the prediction is a vector of binary zeros. When the zeros are ORed together, a binary zero results (indicating that a correction is needed). A one bit left shift may therefore be performed, moving the leading one to bit position 63.

FIG. 7 is a second example of the operation of the leading one correction circuit 50. The example of FIG. 7 illustrates a correct prediction by the leading one predictor 44. In the example, the leading one prediction predicts the leading one in bit position 61. The result significand has a leading one in bit position 61. Therefore, the leading one will be in bit position 63 after the left shift performed by the shifter 48 in response to the leading one prediction. The bitwise AND of the result significand and the leading one prediction is a vector of binary zeros with a binary one at bit position 61. The resulting OR is a binary one, indicating that no correction is needed. Accordingly, the output of the shifter 48 is output as the normalized significand.

Carrier Medium

Figure 8:
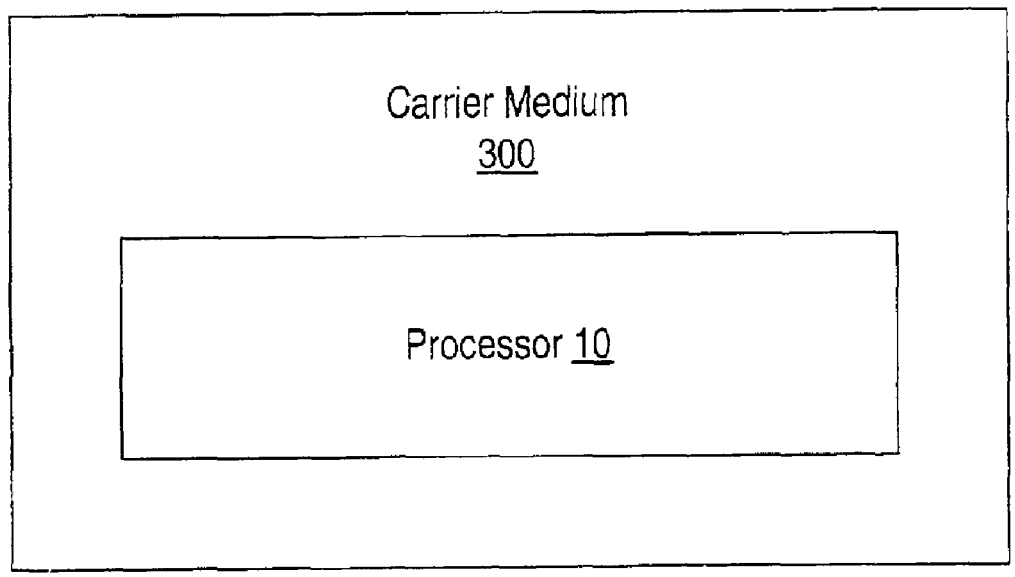
FIG. 8 is a block diagram of one embodiment of a carrier medium.

Turning next to FIG. 8, a block diagram of a carrier medium 300 including a database representative of the processor 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of the processor 10 carried on carrier medium 300 may be a database which can be read by a program and used, directly or indirectly, to fabricate the hardware comprising the processor 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the processor 10. The netlist may then be placed and routed to produce a data set describing geometric shapes to be applied to masks. The masks may then be used in various semiconductor fabrication steps to produce a semiconductor circuit or circuits corresponding to the processor 10. Alternatively, the database on carrier medium 300 may be the netlist (with or without the synthesis library) or the data set, as desired.

While carrier medium 300 carries a representation of the processor 10, other embodiments may carry a representation of any portion of processor 10, as desired, including any floating point execution units, leading one correction circuits, shifters, adders, leading one predictors, encoders, etc.

Numerous variations and modifications will become apparent to those skilled in the art once the above disclosure is fully appreciated. It is intended that the following claims be interpreted to embrace all such variations and modifications.

What is claimed is:

1. An apparatus for use with an adder configured to generate a value and a leading one predictor configured to generate a one hot vector as a leading one prediction in which each bit of the one hot vector corresponds to a different bit in the value, the apparatus comprising a circuit coupled to receive the value and the one hot vector to generate an indication of whether or not the leading one prediction is correct for the value.

2. The apparatus as recited in claim 1 further comprising a first shifter coupled to receive the value and a shift amount indicated by the leading one prediction, wherein the first shifter is configured to shift the value responsive to the shift amount to produce a shift result.

3. The apparatus as recited in claim 2 further comprising a second shifter coupled to receive the shift result and the indication, wherein the second shifter is configured to shift the shift result one bit if the indication indicates that the leading one prediction is not correct.

4. The apparatus as recited in claim 1 wherein the circuit comprises a plurality of first logic circuits, each of the plurality of first logic circuits is coupled to receive a bit of the value and a corresponding bit of the one hot vector and to generate an output responsive to the bit and the corresponding bit.

5. The apparatus as recited in claim 4 further comprising a second logic circuit coupled to receive the outputs of the plurality of first logic circuits and to generate the indication responsive to the outputs.

6. The apparatus as recited in claim 5 wherein each of the plurality of first logic circuits is an AND gate.

7. The apparatus as recited in claim 6 wherein the second logic circuit is configured to OR the outputs of the plurality of first logic circuits.

8. The apparatus as recited in claim 1 wherein the value is a significand of a floating point number.

9. A floating point execution unit comprising:

an adder coupled to receive at least two significands and configured to generate an output significand in response thereto;

a leading one predictor coupled to receive the at least two significands and configured to generate a one hot vector as a leading one prediction in which each bit of the one hot vector corresponds to a different bit in the output significand in response to an operation performed on the at least two significands; and a circuit coupled to receive the output significand and the one hot vector, wherein the circuit is configured to generate an indication of whether or not the leading one prediction is correct for the output significand.

10. The floating point execution unit as recited in claim 9 further comprising a first shifter coupled to receive the output significand and a shift amount indicated by the leading one prediction, wherein the first shifter is configured to shift the output significand responsive to the shift amount to produce a shift result.

11. The floating point execution unit as recited in claim 10 further comprising a second shifter coupled to receive the shift result and the indication, wherein the second shifter is configured to shift the shift result one bit if the indication indicates that the leading one prediction is not correct.

12. The floating point execution unit as recited in claim 9 wherein the circuit comprises a plurality of first logic circuits, wherein each of the plurality of first logic circuits is coupled to receive a bit of the output significand and a corresponding bit of the one hot vector and to generate an output responsive to the bit and the corresponding bit.

13. The floating point execution unit as recited in claim 12 further comprising a second logic circuit coupled to receive the outputs of the plurality of first logic circuits and to generate the indication responsive to the outputs.

14. The floating point execution unit as recited in claim 13 wherein each of the plurality of first logic circuits is an AND gate.

15. The floating point execution unit as recited in claim 14 wherein the second logic circuit is configured to OR the outputs of the plurality of logic circuits.

16. A method comprising:

receiving a value from an adder and a corresponding leading one prediction in form of a one hot vector in which each bit of the one hot vector corresponds to a different bit in the value; and determining if the leading one prediction is correct for the value by using the one hot vector to operate on corresponding bits of the value.

17. The method as recited in claim 16 further comprising shifting the value responsive to a shift amount indicated by the leading one prediction to produce a shift result, wherein the shifting is performed concurrent with the determining if the shift amount is correct by the leading one prediction.

18. The method as recited in claim 17 further shifting the shift result one bit if the leading one prediction is not correct.

19. The method as recited in claim 16 wherein the determining comprises logically ANDing each of the bits of the value with a corresponding bit of the one hot vector.

20. The method as recited in claim 19 wherein the determining further comprises logically combining a result of the logically ANDing each of the bits of the value with the corresponding bit of the one hot vector.

21. The method as recited in claim 19 wherein the logically combining the result comprises logically ORing the result.

22. The method as recited in claim 16 wherein the value is a significand of a floating point number.

* * * * *